Jan. 16, 1968  J. L. WEBB  3,363,930
CONVEYING GLASS SHEETS
Filed May 4, 1966
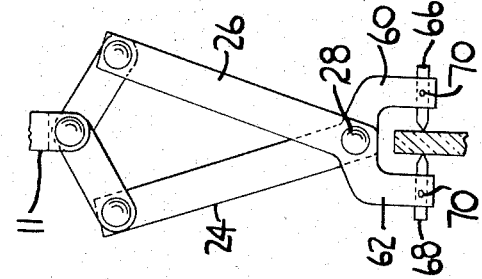
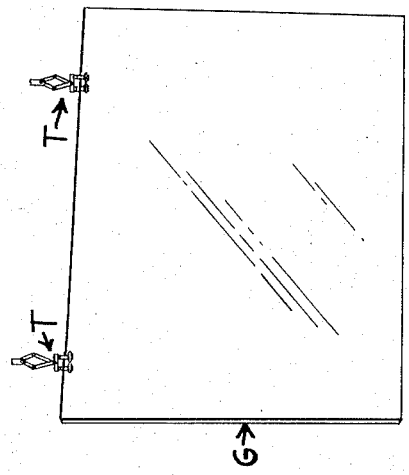
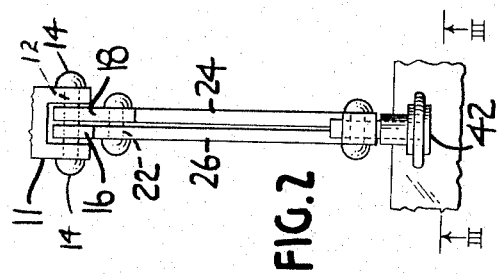
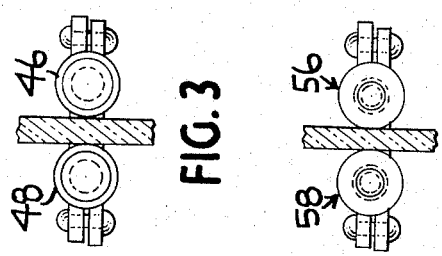
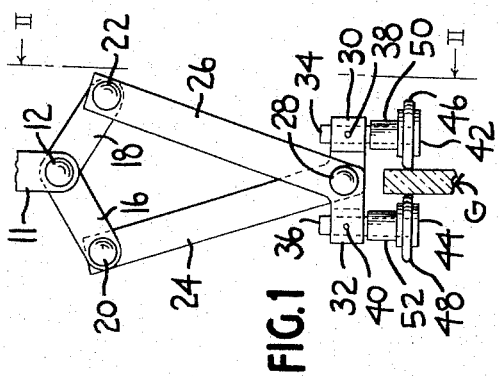
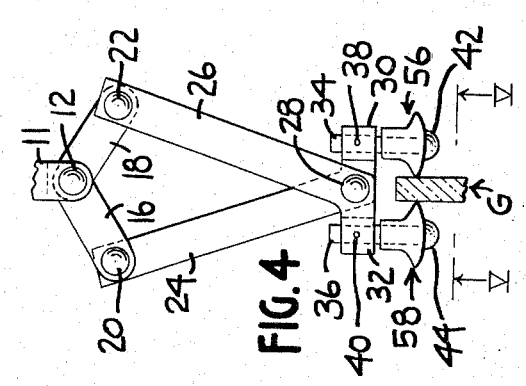
INVENTOR
JAMES L. WEBB
BY
Chisholm and Spencer
ATTORNEYS

United States Patent Office 3,363,930
Patented Jan. 16, 1968

3,363,930
CONVEYING GLASS SHEETS
James L. Webb, Crestline, Ohio, assignor to Pittsburgh Plate Glass Company, Pittsburgh, Pa., a corporation of Pennsylvania
Filed May 4, 1966, Ser. No. 547,594
6 Claims. (Cl. 294—118)

ABSTRACT OF THE DISCLOSURE

Glass gripping tongs comprising a pair of glass contacting elements of a fired ceramic composition having a greater coefficient of friction with glass than stainless steel throughout the temperature range at which glass is thermally processed for such fabrication operations as bending, annealing, tempering, coating and combinations thereof.

---

This invention relate to conveying glass sheets and specifically refers to improved elements for contacting glass sheets during thermal treatment.

Several different glass sheet treatment operations involving heating the glass to above its strain point followed by cooling the glass to below its strain point are well known in the art. Such treatments involve bending, annealing, tempering, coating, and combinations thereof.

In the past, glass sheets have been bent by supporting the glass in bending relation to an outline mold of stainless steel, heating the glass to its deformation temperature, permitting the glass to sag into conformity with the upper shaping surface of the outline mold, and cooling the bent glass while so supported. If the bent glass was to be tempered, it was chilled rapidly. If it was to be annealed, it was cooled relatively slowly through the annealing range of the glass.

Glass sheets have been tempered by suspending them by tongs which grip the upper glass sheet surfaces near the upper glass edge while the glass is first heated to a temperature sufficient for tempering followed by sudden quenching. Such tong supporting operations were also used to support the glass for an additional step for shaping the glass by pressurized engagement between a pair of shaping members having continuous shaping surfaces complementary to one another. Tongs have also been used to grip the glass for coating, either by applying to a glass sheet a glass frit composition which fuses to the glass on heating or by applying a hydrolizable metal salt capable of reacting to form a metal oxide on contacting a heated glass surface.

Glass sheets have also been supported for thermal treatment in a vertical or near vertical orientation by a "basket" type of support in which a metal screen or a series of spaced blocks of light refractory materials such as "Marinite" (registered trademark) supported the glass sheet along its lower edge and spaced balancing members loosely engaged the upper portion of the supported glass sheet to balance the latter.

In a recent development known as the gas hearth process, glass sheets are supported upon a fluid bed and propelled along a path of movement through a hot zone and thence through a cool zone by having stainless steel driving discs rotate to propel the glass sheets through said zones by frictional engagement through their edge surface only.

The glass contacting elements of the prior art left something to be desired. If made of stainless steel or another material non-reactive to glass at the elevated temperatures of the glass processing temperatures, the difference in specific heat and thermal conductivity between the glass and the metal resulted in a considerable difference in the rate of temperature change of the glass and the glass contacting element in response to a change in an environmental temperature to which the glass was exposed. If composed of a refractory material such as "Marinite" (registered trademark), the glass contacting element was subject to frequent breakage and thus requiring frequent replacement.

It has now been found that it is possible to employ glass contacting elements having a high coefficient of friction against glass, providing a lower heat transfer rate between the glass contacting element and glass than stainless steel while providing greater resistance to breakage and a much harder material than refractory substances previously used.

According to the present invention, the glass contacting elements are composed of a fired ceramic composition. An illustrative example has an aluminum oxide content of at least about 85 percent by weight. The composition is formed to the desired shape and then fired at a temperature of above 1500 degrees centigrade. Such glass contacting elements are superior to those of the prior art because of the following characteristics:

(1) A fired ceramic composition having a high aluminum oxide content has a greater coefficient of friction with glass throughout the temperature range at which glass is thermally processed for bending, annealing, tempering, coating, and combinations thereof.

(2) A fired ceramic composition having a high aluminum oxide content has a specific heat and a thermal conductivity much more compatible with that of conventional soda-lime-silica glass compositions found in commercial plate glass, sheet glass, and float glass than the corresponding characteristics of stainless steel. Therefore, the presently proposed glass engaging members cause less variation in heating and cooling rates in that portion of the glass in contact with the glass engaging members compared to the remainder of the glass sheet than prior art glass engaging members.

(3) a fired ceramic composition having a high aluminum oxide content is harder than other ceramic materials previously used for the thermal processing of glass at elevated temperatures.

(4) A fired ceramic composition having a high aluminum oxide content is less subject to oxidation at elevated temperatures involved in glass processing than stainless steel.

Normally when glass is processed thermally it is conveyed along a path of travel through zones of different temperature including some areas at a temperature higher than the strain point. The glass contacting members are in continuous engagement with one or more localized portions of a glass sheet. In this event, improvement occurs from having the glass contacted by a glass contacting element of a fired ceramic composition consisting essentially of at least about 85 percent by weight of aluminum oxide rather than one composed of prior art materials.

Embodiments illustrating various forms of the present invention will now be described in order to facilitate an understanding of the present invention. In the drawings which form part of the description, and wherein like reference numerals refer to similar structural elements.

FIG. 1 is a fragmentary elevational view of a pair of glass gripping tongs taken across the thickness of the upper portion of a glass sheet;

FIG. 2 is an end view taken along the lines II—II of FIG. 1;

FIG. 3 is a fragmentary section bottom view taken along the lines of III—III of FIG. 2;

FIGS. 4 and 5 are views of an alternative embodiment of tongs similar to the views shown in FIGS. 1 and 3 respectively;

FIG. 6 is a view similar to FIGS. 1 and 4 of still another embodiment of another invention;

FIG. 7 is a typical view showing how tongs of the type disclosed in the FIGS. 1, 4 and 6 suspend a glass sheet for thermal processing; and Referring to the drawings, FIGS. 1 to 3 show one embodiment of tongs improved by the present invention. In this embodiment, an apertured clevis 11 is carried by a carriage (not shown) supported on a monorail (not shown). The latter extends through a heating furnace of tunnel-like configuration and a fluid imparting apparatus, neither of which is shown but which are well known in the art.

The fluid imparting apparatus may be either an air blasting station for tempering apparatus or a fluid spraying station for apparatus to impart a coating to the glass sheets. Since neither the heating furnace or the air blasting or fluid spraying stations are part of the present invention, they are not described in detail herein.

The apertured clevis 11 supports a tong support pin 12 through its aperture. Enlarged head rivets 14 secure the tong support pin 12 in place on the clevis. Links 16 and 18 are pivoted to tong support pin 12 at their upper ends. At their lower ends, links 16 and 18 carry one of a pair of link pins 20 and 22. Link pins 20 and 22 are provided with enlarged head rivets for the same purpose as tong support pin 12. Tong arms 24 and 26 are apertured at their upper portions to receive one or the other of the link pins 20 and 22. Link pin 20 pivotally attaches the upper portion of tong arm 24 to the lower portion of link 16 whereas link pin 22 pivotally secures the lower portion of link 18 to the upper portion of tong arm 26. A common hinge pin 28 secures tong arms 24 and 26 to one another near their lower portion.

Beyond the common hinge pin 28, tong arm 24 forms an apertured extension 30 and tong arm 26 forms an apertured extension 32. A rod 34 extends through a vertical aperture in apertured extension 30 and a similar rod 36 extends likewise through a vertical aperture in apertured extension 32. Each rod has a diametrically extending hole that matches with cross-holes extending generally horizontally through the apertured extensions 30 and 32. This permits cotter pins 38 and 40 to secure the rods 34 and 36 to the respective extensions 30 and 32.

The lower end of rod 34 has an enlarged head 42 and the lower end of rod 36 has an enlarged head 44. A disc 46 is rotatably mounted in concentric relation around rod 34 and makes bearing contact with the upper surface of head 42. Another disc 48 is similarly mounted around rod 36 to make bearing contact with the upper surface of head 44. Sleeves 50 and 52 are rotatably mounted above discs 46 and 48, respectively, about rods 34 and 36. The sleeves may be provided with outward extending flanges at their bottom ends.

Discs 46 and 48 have larger diameters than the flanges on the sleeves 50 and 52 and the heads 42 and 44. Thus, their peripheral edges, which are of appreciable axial extent (for example, about 1/8 inch or about 3 millimeters thick), make free rotating contact with the opposite major surfaces of a glass sheet G that is gripped between said discs in pressurized engagement. The tongs structure depicted in FIGS. 1 to 3 is similar to that of the prior art as exemplified by U.S. Patent No. 3,089,727 to William J. Hay, except for the fact that the prior art tongs were made of stainless steel including the glass engaging elements. The discs 46 and 48, which form the glass engaging elements of the tongs exemplifying one embodiment of the present invention, are composed of a fired ceramic material consisting essentially of at least 85 percent by weight of aluminum oxide. The remainder of the tongs other than the glass engaging elements 46 and 48 is unchanged from the prior art tongs and composed of stainless steel.

The glass engaging elements of the tongs shown in FIGS. 4 and 5 are in the shape of bells 56 and 58, with their wide bottom portions making glass contact. The bells of this embodiment are composed of a fired ceramic material having an aluminum oxide content of over about 85 percent by weight.

In FIG. 6, tong arms 24 and 26 have downwardly extending portions 60 and 62 respectively below the common hinge pin 28. The glass engaging members 66 and 68 are elongated rods of fired ceramic material having at least about 85 percent aluminum oxide by weight that extend toward one another through horizontal apertures in the portions 60 and 62 and are secured thereto by cotter pins 70. The pointed rods 66 and 68 grip the glass sheet G therebetween in a manner similar to that provided by stainless steel tong points of the prior art.

FIG. 7 shows how a glass sheet G is gripped by tongs T for conveyance through a heating furnace where the glass is heated above the strain point and thence through a second treating apparatus where the glass is either coated or suddenly chilled for tempering while still engaged by the tongs.

The exact composition of the glass engaging members is kept secret by its manufacturer, Diamonite Products Manufacturing Company, Shreve, Ohio, a division of United States Ceramic Tile Company, Canton, Ohio. However, the essential ingredient in all of the compositions used is aluminum oxide. All of the compositions providing improvement over prior art glass engaging elements contain at least 85 percent by weight of aluminum oxide and minor proportions of other ingredients which include at least one of the following: magnesium oxide, calcium oxide, silicon carbide.

Typical aluminum oxide materials suitable for use in handling glass above the strain point of glass and how they are produced may be found in U.S. Patent No. 2,979,414 issued Apr. 11, 1961, to Eugene I. Ryshkewitch et al. and U.S. Patent No. 3,240,560, issued Mar. 15, 1966, to Carl D. Spear.

The present invention was tested by employing two sets of tongs to grip a number of glass sheets that were tempered in the usual commercial manner by heating to above the strain point followeed by sudden chilling. One set of tongs was made entirely of stainless steel including a pair of stainless steel discs that served as glass engaging elements. The other set of tongs replaced each stainless steel disc with a glass engaging element of the same dimensions composed of composition P–3142–1 of Diamonite Products Company — a ceramic composition consisting essentially of 95 to 97 percent by weight of aluminum oxide and minor amounts of other ingredients produced by firing at 1675 degrees centigrade. Thus, each sheet tempered had one portion engaged by stainless steel discs and another portion engaged by discs containing a substantial amount of aluminum oxide as an essential ingredient.

The portions engaged by stainless steel discs showed heavier tong marks than the portions engaged by the ceramic discs. From the results of this experiment, production tongs were changed by replacing the prior art stainless steel discs with the novel fired ceramic discs of the present invention. The optical quality of tong processed glass improved immediately after the changeover was made.

Another use for the present invention is provided in bottom edge support members for glass sheets supported along their lower edges for thermal processing. Typical apparatus of this type comprises a frame whose upper portion supports one or more hairpin like balancing members that diverge downward to loosely engage the upper edge of a glass sheet and a lower portion to which are attached one or more spaced bottom edge support blocks 88 composed of a material of high aluminum oxide content. In this embodiment, fired ceramic blocks of high aluminum oxide content (at least about 85 percent by weight) last longer than other refractory materials used and produce glass having better optical properties than prior art blocks.

Still another use of the present invention is in the structure of outline molds for bending glass sheets by gravity sagging. Instead of using an outline mold of stainless steel having an upper shaping surface conforming in elevation and plan outline to the shape desired for the bent glass sheet, the outline mold according to this aspect of the present invention is composed of a fired ceramic material having at least about 85 percent by weight of aluminum oxide.

While the embodiments described previously are limited to glass contacting elements of a fired ceramic composition consisting essentially of at least about 85 percent by weight of aluminum oxide, other ceramic materials having the requisite properties of greater hardness and higher tensile strength than pressed asbestos and substantially less thermal conductivity and a substantially lower thermal capacity than that of stainless steel may be employed, such as silicon carbide, zirconium oxide, certain lithium containing refractories and porcelains and the like as well as compositions of lower aluminum oxide content that are produced by firing at elevated temperatures under considerable pressure. The latter materials are all superior to stainless steel as glass contacting elements because of their lower thermal capacity and lower heat conductivity and superior in wear to non-fired ceramic materials such as Marinite and pressed asbestos.

The form of the invention shown and described in this disclosure represents an illustrative preferred embodiment and certain modifications thereof. It is understood that various changes may be made without departing from the spirit of the invention as defined in the claimed subject matter that follows.

What is claimed is:

1. In apparatus for conveying glass sheet for thermal treatment over a temperature range that extends above and below the strain point of glass, glass gripping tongs comprising a pair of glass contacting elements of a fired ceramic composition having a high aluminum oxide content having a greater coefficient of friction with glass than stainless steel throughout the temperature range at which glass is thermally processed to produce fabricated glass products.

2. In apparatus as in claim 1, comprising a pair of tongs including a tong support pin, a pair of links each having an upper portion and a lower portion, each link being pivoted at its upper portion to said tong support pin, a pair of link pins, a pair of tong arms each having an upper portion and a lower portion, one of said link pins pivotally connecting the lower portion of one of said links and the upper portion of one of said tong arms, the other of said link pins pivotally connecting said tong arms together at a point below said link pin connections, and a glass contacting element carried by each of said tong arms below said common hinge pin, said glass contacting elements being in opposing relation to one another to engage the opposite surfaces of a glass sheet in pressurized contact near its top edge, the improvement wherein each of said glass contacting elements is composed of said fired ceramic composition consisting essentially of at least 85 percent by weight of aluminum oxide.

3. The improvement according to claim 2, wherein said glass contacting elements are constructed in the form of freely rotatable discs having appreciable thickness and adapted to engage a glass sheet between the opposed peripheral portions thereof.

4. The improvement according to claim 2, wherein the remainder of said tongs other than said glass contacting elements is composed of a material having greater density than said glass contacting elements.

5. In apparatus as in claim 1, wherein said glass contacting element comprises a cylindrically shaped element of said fired ceramic composition.

6. In apparatus as in claim 1, wherein said glass contacting element is composed of a fired ceramic composition consisting essentially of at least about 85 percent of aluminum oxide.

References Cited

UNITED STATES PATENTS

| | | | |
|---|---|---|---|
| 1,923,036 | 8/1933 | Knopf | 263—6 |
| 3,026,210 | 3/1962 | Coble | 106—39 |
| 3,089,727 | 5/1963 | Hay | 294—118 |
| 3,171,527 | 3/1965 | Andersen | 193—37 |

RICHARD E. AEGERTER, *Primary Examiner.*

UNITED STATES PATENT OFFICE
CERTIFICATE OF CORRECTION

Patent No. 3,363,930　　　　　　　　　　　　January 16, 1968

James L. Webb

It is hereby certified that error appears in the above numbered patent requiring correction and that the said Letters Patent should read as corrected below.

Column 6, line 43, for "3,171,527" read -- 3,171,528 --.

Signed and sealed this 20th day of May 1969.

(SEAL)
Attest:

Edward M. Fletcher, Jr.
Attesting Officer

Commissioner of Patents